(12) United States Patent
Kang

(10) Patent No.: US 12,487,630 B2
(45) Date of Patent: Dec. 2, 2025

(54) CLOCK DISTRIBUTION NETWORK, AND SEMICONDUCTOR APPARATUS AND SEMICONDUCTOR SYSTEM USING THE CLOCK DISTRIBUTION NETWORK

(71) Applicant: SK hynix Inc., Icheon-si (KR)

(72) Inventor: Ji Hyo Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 150 days.

(21) Appl. No.: 18/406,858

(22) Filed: Jan. 8, 2024

(65) Prior Publication Data

US 2025/0053190 A1    Feb. 13, 2025

(30) Foreign Application Priority Data

Aug. 7, 2023  (KR) .......................... 10-2023-0102882

(51) Int. Cl.
*G06F 1/10* (2006.01)
*G11C 7/22* (2006.01)
*H03K 3/037* (2006.01)
*H03K 19/0185* (2006.01)

(52) U.S. Cl.
CPC ............... *G06F 1/10* (2013.01); *H03K 3/037* (2013.01); *H03K 19/018521* (2013.01); *G11C 7/222* (2013.01)

(58) Field of Classification Search
CPC .................................. G06F 1/10; G11C 7/222
See application file for complete search history.

(56) References Cited

U.S. PATENT DOCUMENTS

| | | | |
|---|---|---|---|
| 2022/0268837 A1 | 8/2022 | Leong et al. | |
| 2023/0370066 A1* | 11/2023 | Kang | ............... H03K 17/6872 |
| 2024/0184323 A1 | 6/2024 | Kang et al. | |
| 2024/0243747 A1* | 7/2024 | Kang | ............. H03K 19/018521 |
| 2024/0312502 A1 | 9/2024 | Kang | |

FOREIGN PATENT DOCUMENTS

KR    1020210128697 A    10/2021

* cited by examiner

*Primary Examiner* — Patrick O Neill
(74) *Attorney, Agent, or Firm* — WILLIAM PARK AND ASSOCIATES LTD.

(57) ABSTRACT

A clock distribution network includes an input control circuit and a clock tree. The input control circuit is configured to generate a control input clock signal based on an input clock signal and a low power mode signal. The clock tree is configured to generate an output clock signal by buffering the control input clock signal. When the low power mode signal is enabled, the input control circuit is configured to change a DC level of the control input clock signal.

26 Claims, 7 Drawing Sheets

CLOCK DISTRIBUTION NETWORK, AND SEMICONDUCTOR APPARATUS AND SEMICONDUCTOR SYSTEM USING THE CLOCK DISTRIBUTION NETWORK

CROSS-REFERENCES TO RELATED APPLICATION

The present application claims priority under 35 U.S.C. § 119(a) to Korean application number 10-2023-0102882, filed on Aug. 7, 2023, in the Korean Intellectual Property Office, which is incorporated herein by reference in its entirety.

BACKGROUND

1. Technical Field

The present disclosure relates to an integrated circuit technology, and more particularly, to a clock distribution network, and a semiconductor apparatus and a semiconductor system using the clock distribution network.

2. Related Art

Electronic devices may include many electronic components, and among the electronic devices, a computer system may include many semiconductor apparatuses made of semiconductors. The semiconductor apparatuses constituting the computer system may communicate with one another by transmitting and/or receiving a system clock signal, a command address signal, and data. The semiconductor apparatuses may synchronize the command address signal and the data with the system clock signal. The semiconductor apparatuses may include an internal clock generation circuit, and the internal clock generation circuit may generate a plurality of internal clock signals from the system clock signal. The internal clock generation circuit may distribute the plurality of internal clock signals into a plurality of internal circuits, which transmit and/or receive the command address signal and the data, through a clock distribution network.

When the semiconductor apparatuses operate in a low power mode, power consumption may be reduced by deactivating the clock distribution network. For example, the semiconductor apparatuses may deactivate the clock distribution network by fixing an input signal of the clock distribution network to a specific logic level. However, when the input signal is fixed to the specific logic level, only a specific transistor among a plurality of transistors constituting the clock distribution network may receive continuous stress, thereby causing uneven deterioration in the clock distribution network.

SUMMARY

In an embodiment, a clock distribution network may include an input control circuit and a clock tree. The input control circuit may be configured to receive an input clock signal and a low power mode signal to generate a control input clock signal and a level signal, to output the input clock signal as the control input clock signal when the low power mode signal is disabled, to output the level signal as the control input clock signal when the low power mode signal is enabled, and to alternately change a direct current (DC) level of the level signal to a first level and a second level each time the low power mode signal is enabled. The clock tree may be configured to receive the control input clock signal to generate an output clock signal by buffering the control input clock signal.

In an embodiment, a semiconductor apparatus may include a global input control circuit and a global clock tree. The global input control circuit may be configured to receive a system clock signal and a global enable signal to output the system clock signal as a control system clock signal when the global enable signal is enabled, to fix a logic level of the control system clock signal when the global enable signal is disabled, and to change a direct current (DC) level of the control system clock signal whenever the global enable signal is disabled. The global clock tree may be configured to receive the control system clock signal to generate a first global clock signal by buffering the control system clock signal.

In an embodiment, a clock distribution network may include an input control circuit and a clock tree. The input control circuit may be configured to receive an enable signal and an input clock signal to generate a level signal by dividing the enable signal, and to output one of the level signal and an input clock signal as a control input clock signal based on the enable signal. The clock tree may be configured to receive the control input clock signal to generate an output clock signal by buffering the control input clock signal.

In an embodiment, a semiconductor apparatus may include a global input control circuit and a global clock tree. The global input control circuit may be configured to receive a system clock signal and a global enable signal to generate a first level signal by dividing the global enable signal, and to output one of the first level signal and the system clock signal as a control system clock signal based on the global enable signal. The global clock tree may be configured to receive the control system clock signal to generate a first global clock signal by buffering the control system clock signal.

DETAILED DESCRIPTION

Figure 1:
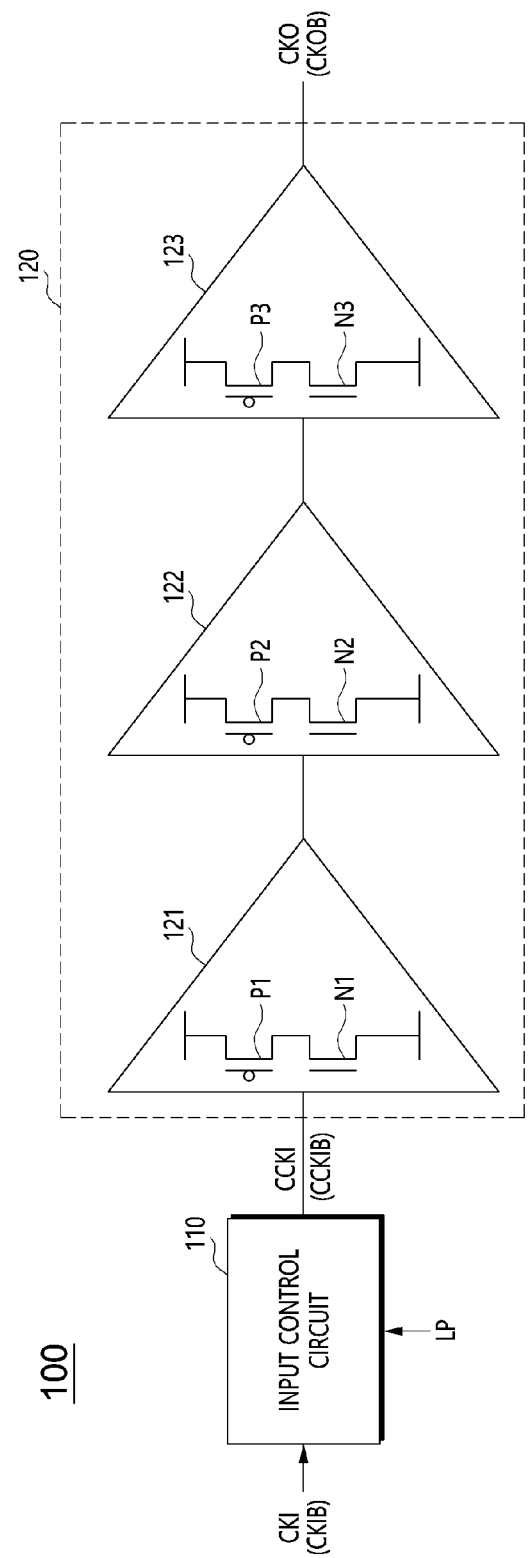
FIG. 1 is a diagram illustrating a configuration of a clock distribution network in accordance with an embodiment.

FIG. 1 is a diagram illustrating a configuration of a clock distribution network 100 in accordance with an embodiment. Referring to FIG. 1, the clock distribution network 100 may receive an input clock signal CKI and generate an output clock signal CKO. The clock distribution network 100 may generate the output clock signal CKO by buffering the input clock signal CKI. The clock distribution network 100 may receive a low power mode signal LP. The low power mode signal LP may be a signal that is enabled when a semiconductor apparatus including the clock distribution network 100 operates in a low power mode. Although not limiting, the low power mode of the semiconductor apparatus may include a sleep mode, a standby mode, a power-down mode, a deep power down mode, or the like. When the low power mode signal LP is disabled, the clock distribution network 100 may be activated to toggle the output clock signal CKO according to the input clock signal CKI. When the low power mode signal LP is enabled, the clock distribution network 100 may be deactivated. When the low power mode signal LP is enabled, the input clock signal CKI may be fixed to a specific logic level. In an embodiment, the clock distribution network 100 may receive an input clock bar signal CKIB together with the input clock signal CKI. The clock distribution network 100 may generate the output clock signal CKO and an output clock bar signal CKOB by buffering the input clock signal CKI and the input clock bar signal CKIB. When the low power mode signal LP is enabled, the input clock signal CKI may be fixed to a first logic level and the input clock bar signal CKIB may be fixed to a second logic level.

The clock distribution network 100 may include an input control circuit 110 and a clock tree 120. The input control circuit 110 may receive the input clock signal CKI and the low power mode signal LP, and generate a control input clock signal CCKI based on the input clock signal CKI and the low power mode signal LP. When the low power mode signal LP is disabled, the input control circuit 110 may output the input clock signal CKI as the control input clock signal CCKI. When the low power mode signal LP is enabled, the input control circuit 110 may fix a logic level of the control input clock signal CCKI. Whenever the low power mode signal LP is enabled, the input control circuit 110 may alternately change a direct current (DC) level of the control input clock signal CCKI. For example, when the low power mode signal LP is first enabled, the input control circuit 110 may fix the logic level of the control input clock signal CCKI to a first logic level, and when the low power mode signal LP is enabled for the second time, the input control circuit 110 may fix the logic level of the control input clock signal CCKI to a second logic level. When the low power mode signal LP is enabled for the third time, the input control circuit 110 may fix the logic level of the control input clock signal CCKI to the first logic level again. Whenever the low power mode signal LP is enabled, the input control circuit 110 may fix the logic level of the control input clock signal CCKI and alternately change the fixed logic level to the first and second logic levels. In an embodiment, the input control circuit 110 may receive the input clock bar signal CKIB together with the input clock signal CKI, and generate a control input clock bar signal CCKIB together with the control input clock signal CCKI. When the low power mode signal LP is disabled, the input control circuit 110 may output the input clock signal CKI as the control input clock signal CCKI, and output the input clock bar signal CKIB as the control input clock bar signal CCKIB. When the low power mode signal LP is enabled, the input control circuit 110 may fix the logic level of the control input clock bar signal CCKIB to a logic level opposite to the logic level of the control input clock signal CCKI.

The clock tree 120 may receive the control input clock signal CCKI from the input control circuit 110. The clock tree 120 may generate the output clock signal CKO by buffering the control input clock signal CCKI. The clock tree 120 may include a plurality of buffers. For example, the clock tree 120 may include a first buffer 121, a second buffer 122, and a third buffer 123. The first to third buffers 121 to 123 may be sequentially connected in series. The first buffer 121 may buffer the control input clock signal CCKI. The second buffer 122 may buffer an output signal of the first buffer 121. The third buffer 123 may generate the output clock signal CKO by buffering an output signal of the second buffer 122. In an embodiment, the clock tree 120 may receive the control input clock bar signal CCKIB together with the control input clock signal CCKI. The first buffer 121 may output a differential clock signal by buffering the control input clock signal CCKI and the control input clock bar signal CCKIB. The second buffer 122 may buffer the differential clock signal output from the first buffer 121. The third buffer 123 may generate the output clock signal CKO and the output clock bar signal CKOB by buffering the differential clock signal output from the second buffer 122.

For example, assuming that the first to third buffers 121 to 123 are inverters, the first buffer 121 may include a P-channel MOS transistor P1 and an N-channel MOS transistor N1, the second buffer 122 may include a P-channel MOS transistor P2 and an N-channel MOS transistor N2, and the third buffer 123 may include a P-channel MOS transistor P3 and an N-channel MOS transistor N3. When the low power mode signal LP is enabled, because the first to third buffers 121 to 123 buffer the control input clock signal CCKI that continuously toggle according to the input clock signal CKI, the P-channel MOS transistors P1 to P3 and the N-channel MOS transistors N1 to N3 may be alternately turned on and/or turned off. That is, in an embodiment, the P-channel MOS transistors P1 to P3 and the N-channel MOS transistors N1 to N3 may operate uniformly, and even deterioration may occur in the P-channel MOS transistors P1 to P3 and the N-channel MOS transistors N1 to N3. When the input control circuit 110 is not provided and the low power mode signal LP is disabled, the input clock signal CKI may be fixed to a specific logic level. For example, when the input clock signal CKI is fixed to a high logic level, the N-channel MOS transistor N1 of the first buffer 121 may be continuously turned on and the P-channel MOS transistor P1 of the first buffer 121 may be continuously turned off. The P-channel MOS transistor P2 of the second buffer 122 may be continuously turned on and the N-channel MOS transistor N2 of the second buffer 122 may be continuously turned off. The N-channel MOS transistor N3 of the third buffer 123 may be continuously turned on, and the P-channel MOS transistor P3 of the third buffer 123 may be continuously turned off. Accordingly, in an embodiment, uneven deterioration may occur in the P-channel MOS transistors P1 to P3 and the N-channel MOS transistors N1 to N3. In an embodiment, the uneven deterioration may degrade the performance of the first to third buffers 121 to 123 and cause duty error, phase mismatch, and delay mismatch of the output clock signal CKO.

Whenever the low power mode signal LP is enabled, the input control circuit 110 may alternately change the DC level of the control input clock signal CCKI. When the low power mode signal LP is first enabled, the input control circuit 110 may fix the logic level of the control input clock signal CCKI to a high logic level. When the control input clock signal CCKI has a high logic level, the N-channel MOS transistor N1 of the first buffer 121, the P-channel MOS transistor P2 of the second buffer 122, and the N-channel MOS transistor N3 of the third buffer 123 may be turned on. When the low power mode signal LP is enabled for the second time, the input control circuit 110 may fix the logic level of the control input clock signal CCKI to a low logic level. When the control input signal CCKI has a low logic level, the P-channel MOS transistor P1 of the first buffer 121, the N-channel MOS transistor N2 of the second buffer 122, and the third P-channel MOS transistor P3 of the third buffer 123 may be turned on. In an embodiment, whenever the low power mode signal LP is enabled, the input control circuit 110 may change the DC level of the control input clock signal CCKI, thereby alternately turning on the P-channel MOS transistors P1 to P3 and the N-channel MOS transistors N1 to N3 of the first to third buffers 121 to 123 and mitigating and/or preventing uneven deterioration from occurring in the P-channel MOS transistors P1 to P3 and the N-channel MOS transistors N1 to N3. Accordingly, in an embodiment, duty error, phase mismatch, and delay mismatch of the output clock signal CKO may be mitigated and/or prevented.

Figure 2:
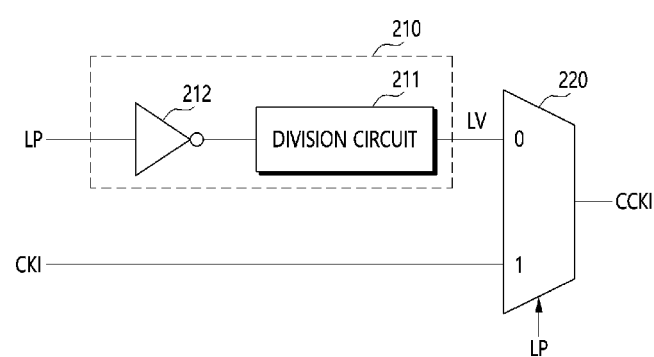
FIG. 2 is a diagram illustrating a configuration of an input control circuit in accordance with an embodiment.

FIG. 2 is a diagram illustrating the configuration of an input control circuit 200 in accordance with an embodiment. The input control circuit 200 may be applied as the input control circuit 110 illustrated in FIG. 1. Referring to FIG. 2, the input control circuit 200 may receive the input clock signal CKI and the low power mode signal LP and generate the control input clock signal CCKI. When the low power mode signal LP is disabled, the input control circuit 200 may output the input clock signal CKI as the control input clock signal CCKI. When the low power mode signal LP is enabled, the input control circuit 200 may output a level signal LV as the control input clock signal CCKI. Whenever the low power mode signal LP is enabled, the input control circuit 200 may change a logic level of the level signal LV. The control input clock signal CCKI may generate the level signal LV by dividing the low power mode signal LP.

The input control circuit 200 may include a polarity conversion circuit 210 and a selection circuit 220. The polarity conversion circuit 210 may receive the low power mode signal LP and generate the level signal LV. Whenever the low power mode signal LP is enabled, the polarity conversion circuit 210 may change the logic level of the level signal LV. The polarity conversion circuit 210 may include a division circuit 211. The division circuit 211 may generate the level signal LV by dividing the low power mode signal LP. In an embodiment, the polarity conversion circuit 210 may further include an inverter 212. The low power mode signal LP may be enabled to a low logic level, and the divider circuit 211 may operate in synchronization with a rising edge. The polarity conversion circuit 210 may further include the inverter 212 in order to invert the low power mode signal LP enabled to a low logic level. However, in an embodiment, the inverter 212 is not an essential component of the polarity conversion circuit 210 and may be optionally provided. In an embodiment, the inverter 212 may be integrated into the division circuit 211.

The selection circuit 220 may receive the level signal LV, the input clock signal CKI, and the low power mode signal LP. The selection circuit 220 may output one of the level signal LV and the input clock signal CKI as the control input clock signal CCKI based on the low power mode signal LP. When the low power mode signal LP is disabled, the selection circuit 220 may output the input clock signal CKI as the control input clock signal CCKI. When the low power mode signal LP is enabled, the selection circuit 220 may output the level signal LV as the control input clock signal CCKI. The selection circuit 220 may include a 2-to-1 multiplexer that receives the low power mode signal LP as a control signal and outputs one of the level signal LV and the input clock signal CKI as the control input clock signal CCKI.

Figure 3:
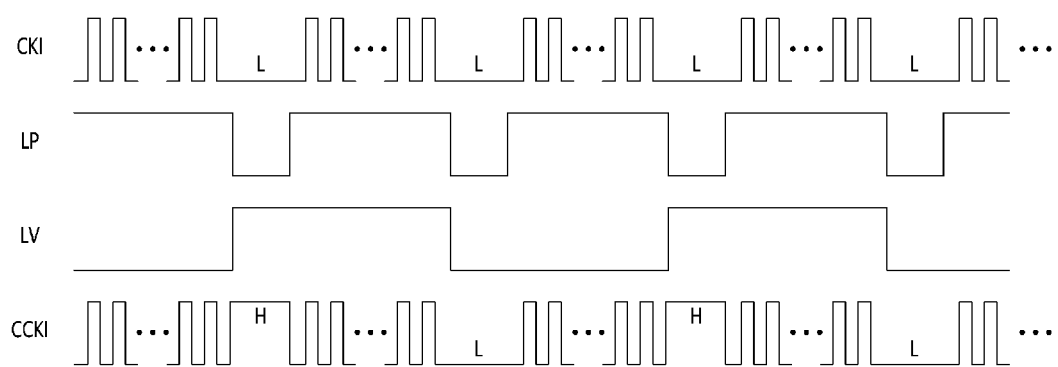
FIG. 3 is a timing diagram illustrating an operation of the clock distribution network in accordance with an embodiment.

FIG. 3 is a diagram illustrating the operation of the clock distribution network 100 in accordance with an embodiment. With reference to FIGS. 1 to 3, the operation of the clock distribution network 100 in accordance with an embodiment is described as follows. When the low power mode signal LP is disabled to a high logic level, the input clock signal CKI may toggle at a constant cycle. When the low power mode signal LP is enabled to a low logic level, the input clock signal CKI may be fixed to a low logic level. In a period in which the low power mode signal LP is disabled, the selection circuit 220 may output the input clock signal CKI as the control input clock signal CCKI, and the first to third buffers 121 to 123 may generate the output clock signal CKO by buffering the control input clock signal CCKI. When the low power mode signal LP is first enabled, the polarity conversion circuit 210 may transition the level signal LV from a low logic level to a high logic level. The selection circuit 220 may output the level signal LV as the control input clock signal CCKI. In a period in which the control input clock signal CCKI is fixed to a high logic level, transistors of a first group in the first to third buffers 121 to 123 may be turned on, and transistors of a second group may be turned off. The transistors of the first group may refer to transistors that are turned on or actively operate when the control input clock signal CCKI has a high logic level. For example, the transistors of the first group may include the N-channel MOS transistor N1 of the first buffer 121, the P-channel MOS transistor P2 of the second buffer 122, and the N-channel MOS transistor N3 of the third buffer 123 in FIG. 1. The transistors of the second group may refer to transistors that are turned on or actively operate when the control input clock signal CCKI has a low logic level. For example, the transistors of the second group may include the P-channel MOS transistor P1 of the first buffer 121, the N-channel MOS transistor N2 of the second buffer 122, and the P-channel MOS transistor P3 of the third buffer 123 in FIG. 1.

When the low power mode signal LP is disabled, the selection circuit 220 may output the input clock signal CKI as the control input clock signal CCKI, and the first to third buffers 121 to 123 may generate the output clock signal CKO by buffering the control input clock signal CCKI. When the low power mode signal LP is enabled for the second time, the polarity conversion circuit 210 may transition the level signal LV from a high logic level to a low logic level. The selection circuit 220 may output the level signal LV as the control input clock signal CCKI. In a period in which the control input clock signal CCKI is fixed to a low logic level, the transistors of the second group in the first to third buffers 121 to 123 may be turned on, and transistors of the first group may be turned off. When the low power mode signal LP is enabled for the third time, the polarity conversion circuit 210 may transition the level signal LV from a low logic level to a high logic level, and in a period in which the low power mode signal LP is enabled for the third time, the transistors of the first group in the first to third buffers 121 to 123 may be turned on. When the low power mode signal LP is enabled for the fourth time, the polarity conversion circuit 210 may transition the level signal LV from a high logic level to a low logic level, and in a period in which the low power mode signal LP is enabled for the fourth time, the transistors of the second group in the first to third buffers 121 to 123 may be turned on. Thus, in an embodiment, whenever the low power mode signal LP is enabled, the input control circuit 200 may alternately change a DC level of the level signal LV by transitioning the level signal LV from a first level (i.e., high logic level) to a second level (i.e., low logic level) in response to enabling the low power mode signal and transitioning the level signal LV from the second level to the first level in response to enabling the low power mode signal. As such, in an embodiment, whenever the low power mode signal LP is enabled, the input control circuit 200 may alternately change a DC level of the level signal LV by transitioning the level signal LV from a first level (i.e., high logic level) to a second level (i.e., low logic level) or transitioning the level signal LV from a second level to a first level each time the low power mode signal is enabled. For example, as illustrated in FIG. 3, when the low power mode signal LP is enabled for the first time, the level signal LV is transitioned to a high logic level, when the low power mode signal LP is enabled for the second time, the level signal LV is transitioned to a low logic level, when the low power mode signal LP is enable for the third time, the level signal LV is transitioned to the high logic level again, and when the low power mode signal LP is enable for the fourth time, the level signal LV is transitioned to the low logic level again. As such, in an embodiment, the input control circuit 200 may alternately change a direct current (DC) level of the level signal LV from a first level to a second level or from the second level to the first level, depending on an initial level of the level signal, each time the low power mode signal LP is enabled after a first time the level signal LV is initially generated or set to a first or second level. In an embodiment, the initial level of the level signal may be the first time the level signal LV is initially generated or set by the input control circuit 200 which may be a high logic level as shown for example in FIG. 3. In other embodiments the initial level of the Level signal LV may be a logic low level. In an embodiment, whenever the low power mode signal LP is enabled, the input control circuit 200 may change the logic level of the level signal LV, thereby alternately turning on the transistors of the first and second groups in the first to third buffers 121 to 123 and mitigating and/or preventing uneven deterioration from occurring in the transistors of the first and second groups. Further, a "high logic level" and a "low logic level" are used to describe the logic levels of signals. A signal having a "high logic level" is distinguished from a signal having a "low logic level." For example, when a signal having a first voltage corresponds to a signal having a "high logic level," a signal having a second voltage may correspond to a signal having a "low logic level." According to an embodiment, a "high logic level" may be set to a voltage higher than a "low logic level." According to an embodiment, the logic levels of signals may be set to different logic levels or opposite logic levels. For example, a signal having a high logic level may be set to have a low logic level in some embodiments, and a signal having a low logic level may be set to have a high logic level in some embodiments.

Figure 4:
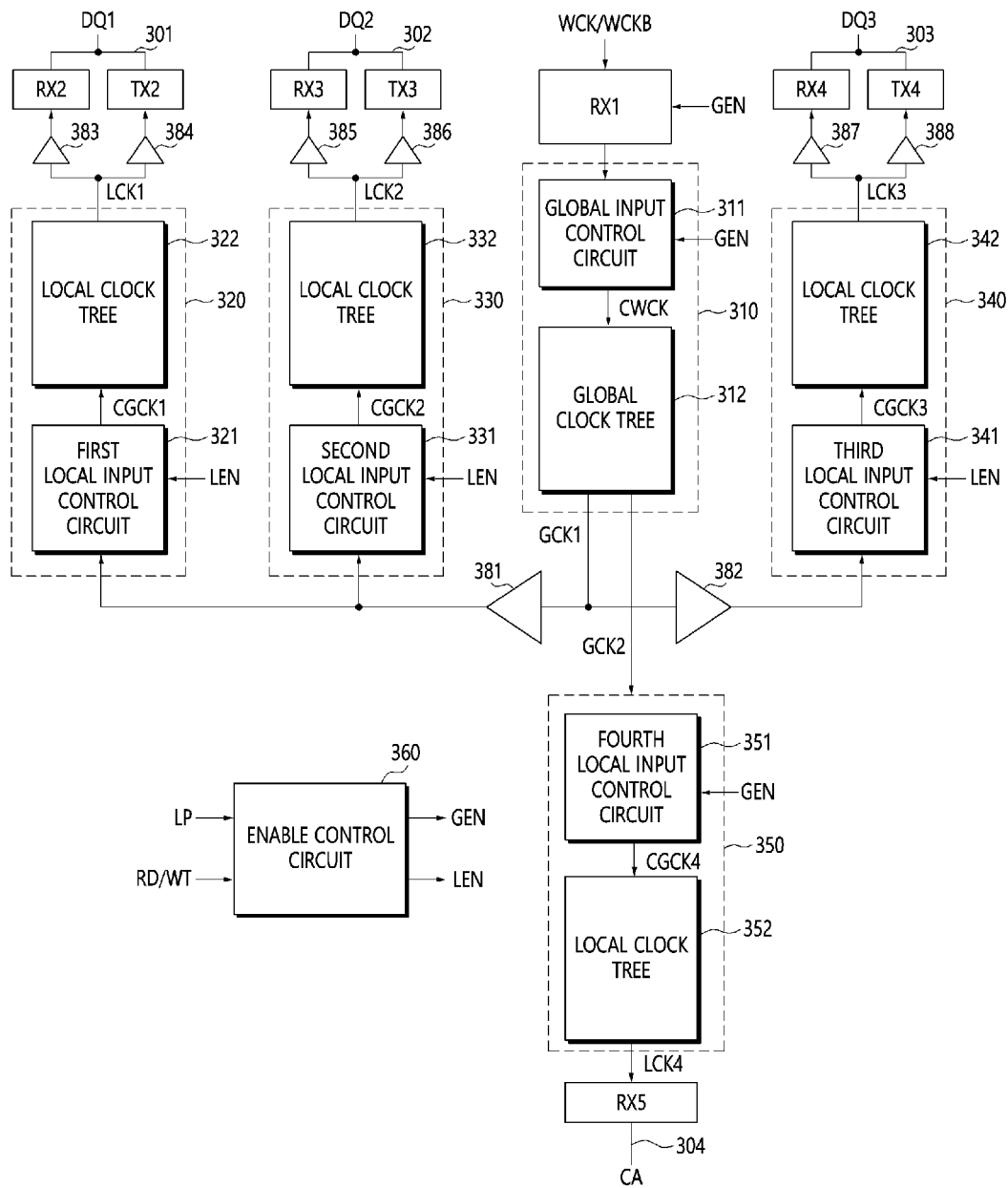
FIG. 4 is a block diagram illustrating a configuration of a semiconductor apparatus in accordance with an embodiment.

FIG. 4 is a diagram illustrating the configuration of a semiconductor apparatus 300 in accordance with an embodiment. Referring to FIG. 4, the semiconductor apparatus 300 may include a clock distribution network. The clock distribution network may receive and buffer a system clock signal WCK. The clock distribution network may distribute the buffered system clock signal WCK to internal circuits of the semiconductor apparatus 300. The clock distribution network may include a global clock generation circuit 310. The global clock generation circuit 310 may receive the system clock signal WCK and a global enable signal GEN, and generate global clock signals GCK1 and GCK2 based on the system clock signal WCK and the global enable signal GEN. The global enable signal GEN may be disabled when the semiconductor apparatus 300 enters a low power mode, and may be enabled when the semiconductor apparatus 300 exits the low power mode. The global enable signal GEN may be generated from a low power mode signal LP. The system clock signal WCK may be received from an external device of the semiconductor apparatus 300. The semiconductor apparatus 300 may further include a clock receiver RX1 that receives the system clock signal WCK. The semiconductor apparatus 300 may receive the system clock signal WCK and a system clock bar signal WCKB as differential signals. The clock receiver RX1 may further receive the global enable signal GEN. When the global enable signal GEN is enabled, the clock receiver RX1 may be activated and may receive the system clock signal WCK. When the global enable signal GEN is disabled, the clock receiving circuit RX1 may be deactivated and may output an output signal fixed to a specific logic level. The clock receiver RX1 may be integrated as a component of the clock distribution network.

The global clock generation circuit 310 may include a global input control circuit 311 and a global clock tree 312. The global input control circuit 311 may receive the system clock signal WCK and the global enable signal GEN and generate a control system clock signal CWCK. When the global enable signal GEN is enabled, the global input control circuit 311 may output the system clock signal WCK as the control system clock signal CWCK. When the global enable signal GEN is disabled, the global input control circuit 311 may fix a logic level of the control system clock signal CWCK. Whenever the global enable signal GEN is disabled, the global input control circuit 311 may alternately change a DC level of the control system clock signal CWCK. The global input control circuit 311 may generate a level signal by dividing the global enable signal GEN, and output the level signal as the control system clock signal CWCK in a period in which the global enable signal GEN is disabled. For example, the global enable signal GEN may be enabled to a high logic level and disabled to a low logic level. The input control circuit 200 illustrated in FIG. 2 may be applied as the global input control circuit 311. When the input control circuit 200 is applied as the global input control circuit 311, the input clock signal CKI, the low power mode signal LP, and the control input clock signal CCKI may be replaced with the system clock signal WCK, the global enable signal GEN, and the control system clock signal CWCK, respectively.

The global clock tree 312 may be connected to the global input control circuit 311 and receive the control system clock signal CWCK from the global input control circuit 311. The global clock tree 312 may generate a first global clock signal GCK1 by buffering the control system clock signal CWCK. The global clock tree 312 may include at least one buffer for buffering the control system clock signal CWCK. The global clock tree 312 may further generate a second global clock signal GCK2 by buffering the control system clock signal CWCK. In an embodiment, the global clock tree 312 may generate the second global clock signal GCK2 by dividing the control system clock signal CWCK, and the second global clock signal GCK2 may have a lower frequency than the first global clock signal GCK1.

The clock distribution network may further include a first local clock generation circuit 320. The global clock generation circuit 310 may provide the first global clock signal GCK1 to the first local clock generation circuit 320. The clock distribution network may further include a first buffer

381 and a second buffer 382 that buffer the first global clock signal GCK1. The first local clock generation circuit 320 may receive the first global clock signal GCK1 and generate a first local clock signal LCK1. The first local clock generation circuit 320 may include a first local input control circuit 321 and a local clock tree 322. The first local input control circuit 321 may receive the first global clock signal GCK1 and a local enable signal LEN and generate a first control global clock signal CGCK1. The local enable signal LEN may be enabled when the semiconductor apparatus 300 performs a data input/output operation. The local enable signal LEN may be generated based on the low power mode signal LP, a read signal RD, and a write signal WT. When the local enable signal LEN is enabled, the first local input control circuit 321 may output the first global clock signal GCK1 as the first control global clock signal CGCK1. When the local enable signal LEN is disabled, the first local input control circuit 321 may fix a logic level of the first control global clock signal CGCK1. Whenever the local enable signal LEN is disabled, the first local input control circuit 321 may alternately change a DC level of the first control global clock signal CGCK1. The first local input control circuit 321 may generate a level signal by dividing the local enable signal LEN, and output the level signal as the first control global clock signal CGCK1 in a period in which the local enable signal LEN is disabled. For example, the local enable signal LEN may be enabled to a high logic level and disabled to a low logic level. The input control circuit 200 illustrated in FIG. 2 may be applied as the first local input control circuit 321. When the input control circuit 200 is applied as the first local input control circuit 321, the input clock signal CKI, the low power mode signal LP, and the control input clock signal CCKI may be replaced with the first global clock signal GCK1, the local enable signal LEN, and the first control global clock signal CGCK1, respectively.

The local clock tree 322 may be connected to the first local input control circuit 321 and receive the first control global clock signal CGCK1 from the first local input control circuit 321. The local clock tree 322 may generate a first local clock signal LCK1 by buffering the first control global clock signal CGCK1. The local clock tree 322 may include at least one buffer for buffering the first control global clock signal CGCK1. The semiconductor apparatus 300 may further include a third buffer 383, a fourth buffer 384, a first data receiver RX2, and a first data transmitter TX2. The third buffer 383 may receive the first local clock signal LCK1 from the local clock tree 322, and buffer the first local clock signal LCK1. The third buffer 383 may provide the first local clock signal LCK1 to the first data receiver RX2. The fourth buffer 384 may receive the first local clock signal LCK1 from the local clock tree 322 and buffer the first local clock signal LCK1. The fourth buffer 384 may provide the first local clock signal LCK1 to the first data transmitter TX2.

The first data receiver RX2 may be connected to a first data transmission line 301 and receive first data DQ1 transmitted from the external device. The first data receiver RX2 may receive the first local clock signal LCK1, and receive the first data DQ1 based on the first local clock signal LCK1. The first data receiver RX2 may receive the first data DQ1 in synchronization with the first local clock signal LCK1, or align the first data DQ1 and generate internal data of the semiconductor apparatus 300. The first data transmitter TX2 may be connected to the first data transmission line 301, and transmit the first data DQ1 generated based on the internal data of the semiconductor apparatus 300 to the external device. The first data transmitter TX2 may receive the first local clock signal LCK1, and transmit the first data DQ1 based on the first local clock signal LCK1. The first data transmitter TX2 may output the first data DQ1 to the first data transmission line 301 in synchronization with the first local clock signal LCK1.

The clock distribution network may further include a second local clock generation circuit 330. The second local clock generation circuit 330 may receive the first global clock signal GCK1 and generate a second local clock signal LCK2. The second local clock generation circuit 330 may include a second local input control circuit 331 and a local clock tree 332. The second local input control circuit 331 may receive the first global clock signal GCK1 and the local enable signal LEN and generate a second control global clock signal CGCK2. When the local enable signal LEN is enabled, the second local input control circuit 331 may output the first global clock signal GCK1 as the second control global clock signal CGCK2. When the local enable signal LEN is disabled, the second local input control circuit 331 may fix a logic level of the second control global clock signal CGCK2. Whenever the local enable signal LEN is disabled, the second local input control circuit 331 may alternately change a DC level of the second control global clock signal CGCK2. The second local input control circuit 331 may generate a level signal by dividing the local enable signal LEN, and output the level signal as the second control global clock signal CGCK2 in a period in which the local enable signal LEN is disabled. The input control circuit 200 illustrated in FIG. 2 may be applied as the second local input control circuit 331. When the input control circuit 200 is applied as the second local input control circuit 331, the input clock signal CKI, the low power mode signal LP, and the control input clock signal CCKI may be replaced with the first global clock signal GCK1, the local enable signal LEN, and the second control global clock signal CGCK2, respectively.

The local clock tree 332 may be connected to the second local input control circuit 331, and receive the second control global clock signal CGCK2 from the second local input control circuit 331. The local clock tree 332 may generate a second local clock signal LCK2 by buffering the second control global clock signal CGCK2. The local clock tree 322 may include at least one buffer for buffering the second control global clock signal CGCK2. The semiconductor apparatus 300 may further include a fifth buffer 385, a sixth buffer 386, a second data receiver RX3, and a second data transmitter TX3. The fifth buffer 385 may receive the second local clock signal LCK2 from the local clock tree 332 and buffer the second local clock signal LCK2. The fifth buffer 385 may provide the second local clock signal LCK2 to the second data receiver RX3. The sixth buffer 386 may receive the second local clock signal LCK2 from the local clock tree 332 and buffer the second local clock signal LCK2. The sixth buffer 386 may provide the second local clock signal LCK2 to the second data transmitter TX3. The second data receiver RX3 may be connected to a second data transmission line 302 and receive second data DQ2 transmitted from the external device. The second data receiver RX3 may receive the second local clock signal LCK2, and receive the second data DQ2 based on the second local clock signal LCK2. The second data receiver RX3 may receive the second data DQ2 in synchronization with the second local clock signal LCK2, or align the second data DQ2 and generate internal data of the semiconductor apparatus 300. The second data transmitter TX3 may be connected to the second data transmission line 302, and transmit the second data DQ2 generated based on the internal data of the semiconductor apparatus 300 to the external device. The second data transmitter TX3 may receive the second local clock signal LCK2, and transmit the second data DQ2 based on the second local clock signal LCK2. The second data transmitter TX3 may output the second data DQ2 to the second data transmission line 302 in synchronization with the second local clock signal LCK2.

The clock distribution network may further include a third local clock generation circuit 340. The third local clock generation circuit 340 may receive the first global clock signal GCK1 and generate a third local clock signal LCK3. The third local clock generation circuit 340 may include a third local input control circuit 341 and a local clock tree 342. The third local input control circuit 341 may receive the first global clock signal GCK1 and the local enable signal LEN and generate a third control global clock signal CGCK3. When the local enable signal LEN is enabled, the third local input control circuit 341 may output the first global clock signal GCK1 as the third control global clock signal CGCK3. When the local enable signal LEN is disabled, the third local input control circuit 341 may fix a logic level of the third control global clock signal CGCK3. Whenever the local enable signal LEN is disabled, the third local input control circuit 341 may change a DC level of the third control global clock signal CGCK3. The third local input control circuit 341 may generate a level signal by dividing the local enable signal LEN, and output the level signal as the third control global clock signal CGCK3 in a period in which the local enable signal LEN is disabled. The input control circuit 200 illustrated in FIG. 2 may be applied as the third local input control circuit 341. When the input control circuit 200 is applied as the third local input control circuit 341, the input clock signal CKI, the low power mode signal LP, and the control input clock signal CCKI may be replaced with the first global clock signal GCK1, the local enable signal LEN, and the third control global clock signal CGCK3, respectively.

The local clock tree 342 may be connected to the third local input control circuit 341, and receive the third control global clock signal CGCK3 from the third local input control circuit 341. The local clock tree 342 may generate a third local clock signal LCK3 by buffering the third control global clock signal CGCK3. The local clock tree 342 may include at least one buffer for buffering the third control global clock signal CGCK3. The semiconductor apparatus 300 may further include a seventh buffer 387, an eighth buffer 388, a third data receiver RX4, and a third data transmitter TX4. The seventh buffer 387 may receive the third local clock signal LCK3 from the local clock tree 342 and buffer the third local clock signal LCK3. The seventh buffer 387 may provide the third local clock signal LCK3 to the third data receiver RX4. The eighth buffer 388 may receive the third local clock signal LCK3 from the local clock tree 342 and buffer the third local clock signal LCK3. The eighth buffer 388 may provide the third local clock signal LCK3 to the third data transmitter TX4. The third data receiver RX4 may be connected to a third data transmission line 303 and receive third data DQ3 transmitted from the external device. The third data receiver RX4 may receive the third local clock signal LCK3, and receive the third data DQ3 based on the third local clock signal LCK3. The third data receiver RX4 may receive the third data DQ3 in synchronization with the third local clock signal LCK3, or align the third data DQ3 and generate internal data of the semiconductor apparatus 300. The third data transmitter TX4 may be connected to the third data transmission line 303, and transmit the third data DQ3 generated based on the internal data of the semiconductor apparatus 300 to the external device. The third data transmitter TX4 may receive the third local clock signal LCK3, and transmit the third data DQ3 based on the third local clock signal LCK3. The third data transmitter TX4 may output the third data DQ3 to the third data transmission line 303 in synchronization with the third local clock signal LCK3.

The clock distribution network may further include a fourth local clock generation circuit 350. The fourth local clock generation circuit 350 may receive the second global clock signal GCK2, and generate a fourth local clock signal LCK4 based on the second global clock signal GCK2. The fourth local clock generation circuit 350 may include a fourth local input control circuit 351 and a local clock tree 352. The fourth local input control circuit 351 may receive the second global clock signal GCK2 and the global enable signal GEN and generate a fourth control global clock signal CGCK4. When the global enable signal GEN is enabled, the fourth local input control circuit 351 may output the second global clock signal GCK2 as the fourth control global clock signal CGCK4. When the global enable signal GEN is disabled, the fourth local input control circuit 351 may fix a logic level of the fourth control global clock signal CGCK4. Whenever the global enable signal GEN is disabled, the fourth local input control circuit 351 may change a DC level of the fourth control global clock signal CGCK4. The fourth local input control circuit 351 may generate a level signal by dividing the global enable signal GEN, and output the level signal as the fourth control global clock signal CGCK4 in a period in which the global enable signal GEN is disabled. The input control circuit 200 illustrated in FIG. 2 may be applied as the fourth local input control circuit 351. When the input control circuit 200 is applied as the fourth local input control circuit 351, the input clock signal CKI, the low power mode signal LP, and the control input clock signal CCKI may be replaced with the second global clock signal GCK2, the global enable signal GEN, and the fourth control global clock signal CGCK4, respectively.

The local clock tree 352 may be connected to the fourth local input control circuit 351, and receive the fourth control global clock signal CGCK4 from the fourth local input control circuit 351. The local clock tree 352 may generate the fourth local clock signal LCK4 by buffering the fourth control global clock signal CGCK4. The local clock tree 352 may include at least one buffer for buffering the fourth control global clock signal CGCK4. The semiconductor apparatus 300 may further include a command address receiver RX5. The command address receiver RX5 may be connected to the external device through a command address bus 304, and receive a command address signal CA transmitted from the external device. The command address receiver RX5 may receive the fourth local clock signal LCK4 from the local clock tree 352. The command address receiver RX5 may receive the command address signal CA based on the fourth local clock signal LCK4. The command address receiver RX5 may receive or latch the command address signal CA in synchronization with the fourth local clock signal LCK4. The low power mode signal LP, the read signal RD, and the write signal WT may each be generated based on the command address signal CA.

The clock distribution network and/or the semiconductor apparatus 300 may further include an enable control circuit 360. The enable control circuit 360 may receive the low power mode signal LP and generate the global enable signal GEN. When the low power mode signal LP is disabled, the enable control circuit 360 may enable the global enable signal GEN. When the low power mode signal LP is enabled, the enable control circuit 360 may disable the global enable signal GEN. The enable control circuit 360 may further receives the read signal RD and the write signal WT, and generate the local enable signal LEN based on at least a part of the low power mode signal LP, the read signal RD, and the write signal WT. When at least one of the read signal RD and the write signal WT is enabled, the enable control circuit 360 may enable the local enable signal LEN. When the low power mode signal LP is enabled, the enable control circuit 360 may disable the local enable signal LEN. Even though the low power mode signal LP is in a disabled state, when both the read signal RD and the write signal WT are disabled, the enable control circuit 360 may disable the local enable signal LEN. Even though the semiconductor apparatus 300 performs no input/output operation of the data DQ1 to DQ3, the global clock generation circuit 310 and the fourth local clock generation circuit 350 may substantially maintain an activated state in order to generate the second global clock signal GCK2 and the fourth local clock signal LCK4 so that the semiconductor apparatus 300 receives the command address signal CA. However, the first to third local clock generation circuits 320, 330, and 340 may be activated only in a period in which the data DQ1 to DQ3 are input and output. In an embodiment, because the enable control circuit 360 may independently control the global enable signal GEN and the local enable signal LEN, power consumption of the clock distribution network and/or the semiconductor apparatus 300 may be optimized, and uneven deterioration of the global clock generation circuit 310 and the local clock generation circuits 320, 330, 340, and 350 may be individually and effectively mitigated.

Figure 5:
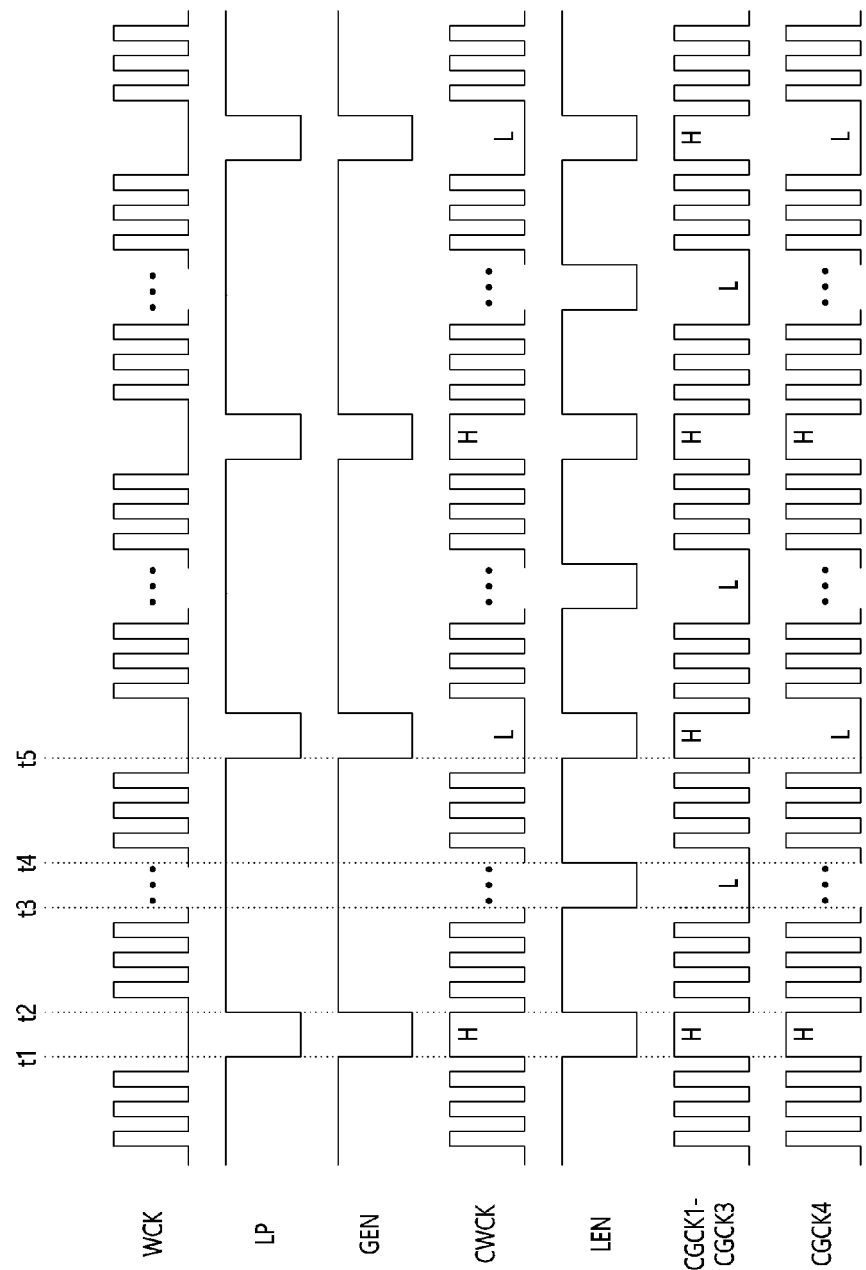
FIG. 5 is a timing diagram illustrating an operation of the semiconductor apparatus in accordance with an embodiment.

FIG. 5 is a timing diagram illustrating the operation of the semiconductor apparatus 300 in accordance with an embodiment. The operation of the semiconductor apparatus 300 in accordance with an embodiment will be described with reference to FIGS. 4 and 5 as follows. When the low power mode signal LP is disabled to a high logic level, the system clock signal WCK may toggle at a constant cycle. When the low power mode signal LP is disabled to a high logic level, the enable control circuit 360 may enable the global enable signal GEN. The global input control circuit 311 may output the system clock signal WCK as the control system clock signal CWCK, and the global clock tree 312 may generate the first and second global clock signals GCK1 and GCK2 from the control system clock signal CWCK. The fourth local input control circuit 351 may output the second global clock signal GCK2 as the fourth control global clock signal CGCK4, and the local clock tree 352 may generate the fourth local clock signal LCK4. In a period in which the low power mode signal LP is disabled to a high level and the data DQ1 to DQ3 are input and output, that is, when one of the read signal RD and the write signal WT is enabled, the enable control circuit 360 may enable the local enable signal LEN. The first to third local input control circuits 321, 331, and 341 may output the first global clock signal GCK1 as the first to third control global clock signals CGCK1 to CGCK3, respectively, and the local clock trees 322, 332, and 342 may generate the first to third local clock signals LCK1 to LCK3, respectively.

At t1, when the low power mode signal LP is enabled, the enable control circuit 360 may disable both the global enable signal GEN and the local enable signal LEN. In such a case, the global input control circuit 311 and the fourth local input control circuit 351 may output the control system clock signal CWCK having a high logic level and the fourth control global clock signal CGCK4, respectively, and the first to fourth local input control circuits 321, 331, 341, and 351 may output the first to fourth control global clock signals CGCK1 to CGCK4 each having a high logic level. Accordingly, transistors of a first group in the global clock tree 312 and the local clock trees 322, 332, 342, and 352 may be turned on, and transistors of a second group may be turned off.

At t2, when the low power mode signal LP is disabled and one of the read signal RD and the write signal WT is enabled, the enable control circuit 360 may enable both the global enable signal GEN and the local enable signal LEN. The global clock generation circuit 310 may generate the first and second global clock signals GCK1 and GCK2 from the system clock signal WCK, the first to third local clock generation circuits 320, 330, 340 may generate the first to third local clock signals LCK1 to LCK3 from the first global clock signal GCK1, and the fourth local clock generation circuit 350 may generate the fourth local clock signal LCK4 from the second global clock signal GCK2.

At t3, when the read signal RD and the write signal WT are disabled, that is, when the data DQ1 to DQ3 are not input and output, the enable control circuit 360 may substantially maintain the global enable signal GEN in an enabled state, and disable the local enable signal LEN. When the local enable signal LEN is disabled, the first to third local input control circuits 321, 331, 341 may output the first to third control global clock signals CGCK1 to CGCK3 each having a low logic level. Accordingly, the transistors of the second group in the local clock trees 322, 332, and 342 may be turned on, and the transistors of the first group may be turned off. At t4, when the read signal RD or the write signal WT is enabled, that is, in a period in which the data DQ1 to DQ3 are input and output, the enable control circuit 360 may enable the local enable signal LEN. The first to third local clock generation circuits 320, 330, and 340 may generate the first to third local clock signals LCK1 to LCK3 from the first global clock signal GCK1, respectively.

At t5, when the low power mode signal LP is enabled, the enable control circuit 360 may disable both the global enable signal GEN and the local enable signal LEN. The global input control circuit 311 and the fourth local input control circuit 351 output the control system clock signal CWCK having a low logic level and the fourth control global clock signal CGCK4, and the first to third local input control circuits 321, 331, and 341 may output the first to third control global clock signals CGCK1 to CGCK3 having a high logic level, respectively. Accordingly, the transistors of the second group may be turned on and the transistors of the first group may be turned off in the global clock tree 312 and the local clock tree 352, and the transistors of the first group may be turned on and the transistors of the second group may be turned off in the local clock trees 322, 332, and 342.

Whenever the global enable signal GEN is disabled, the global input control circuit 311 and the fourth local input control circuit 351 may alternately change the DC levels of the control system clock signal CWCK and the fourth global control clock signal CGCK4, and whenever the local enable signal LEN is disabled, the first to third local input control circuits 321, 331, and 341 may alternately change the DC levels of the first to third control global clock signals CGCK1 to CGCK3. Accordingly, the transistors of the first and second groups provided in the global clock tree 312 and the local clock trees 322, 332, 342, and 352 may be uniformly turned on, and uneven deterioration in the transistors of the first and second groups may be mitigated.

Figure 6:
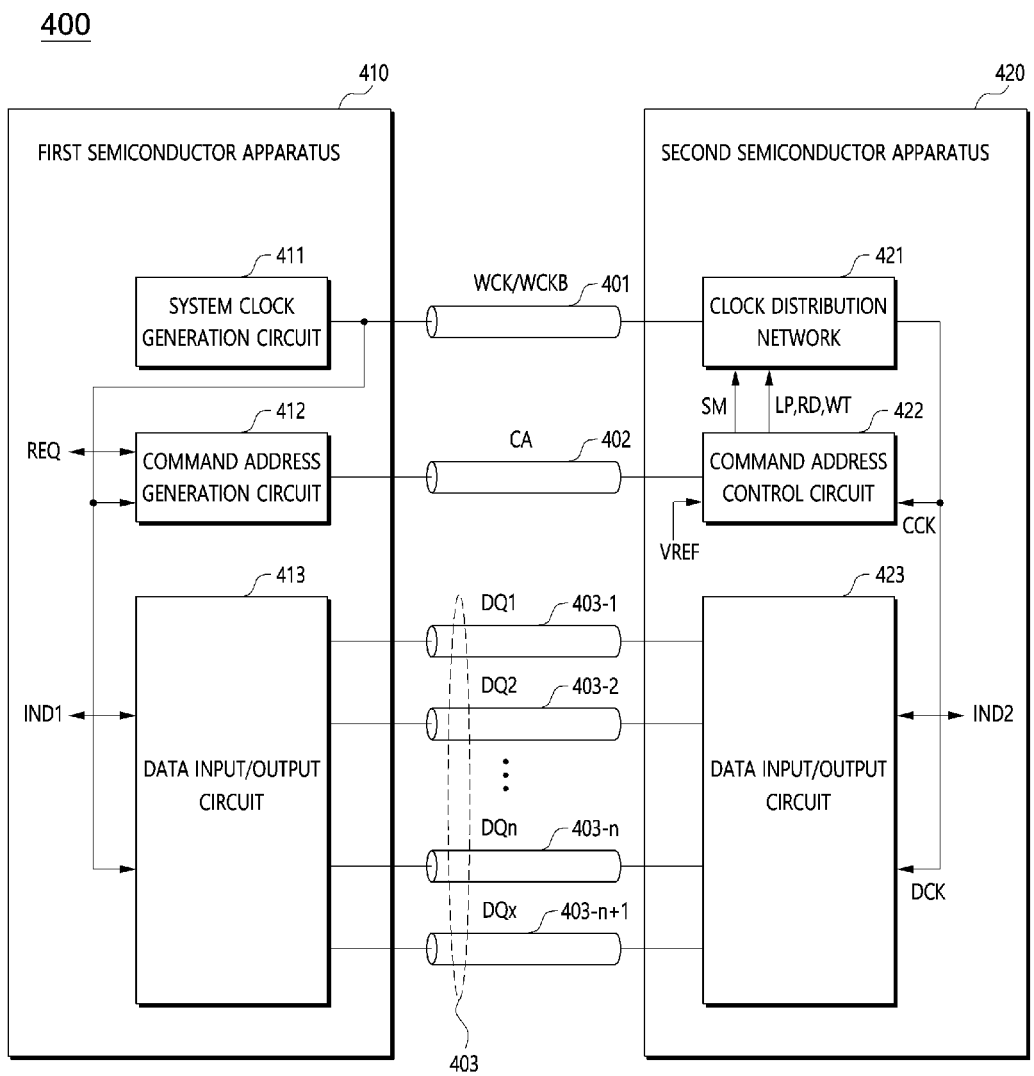
FIG. 6 is a diagram illustrating a configuration of a semiconductor system in accordance with an embodiment.

FIG. 6 is a diagram illustrating a configuration of a semiconductor system 400 in accordance with an embodiment.

Referring to FIG. 6, the semiconductor system 400 may include a first semiconductor apparatus 410 and a second semiconductor apparatus 420. The first semiconductor apparatus 410 may be a master device for controlling an operation of the second semiconductor apparatus 420, and the second semiconductor apparatus 420 may be a slave device capable of performing various operations under the control of the first semiconductor apparatus 410. The first semiconductor apparatus 410 may provide various control signals necessary for the second semiconductor apparatus 420 to operate. The first semiconductor apparatus 410 may include various types of host devices. For example, the first semiconductor apparatus 410 may be a host device such as a central processing unit (CPU), a graphics processing unit (GPU), a multimedia processor (MMP), a digital signal processor, an application processor (AP), and a memory controller. For example, the second semiconductor apparatus 420 may be a memory device, and the memory device may include a volatile memory and a nonvolatile memory. The volatile memory may include static RAM (SRAM), dynamic RAM (DRAM), and synchronous DRAM (SDRAM), and the nonvolatile memory may include read only memory (ROM), programmable ROM (PROM), electrically erasable and programmable ROM (EEPROM), erasable programmable ROM (EPROM), flash memory, phase change RAM (PRAM), magnetic RAM (MRAM), resistive RAM (RRAM), ferroelectric RAM (FRAM), and the like.

The second semiconductor apparatus 420 may be connected to the first semiconductor apparatus 410 through a plurality of buses. The plurality of buses may be signal transmission paths, links, or channels for transmitting signals. The plurality of buses may include a clock bus 401, a command address bus 402, a data bus 403, and the like. The clock bus 401 and the command address bus 402 may be a unidirectional bus from the first semiconductor apparatus 410 to the second semiconductor apparatus 420, and the data bus 403 may be a bidirectional bus. The second semiconductor apparatus 420 may be connected to the first semiconductor apparatus 410 through the clock bus 401, and may receive a system clock signal WCK from the first semiconductor apparatus 410. The system clock signal WCK may be transmitted through the clock bus 401 as a differential signal together with a system clock bar signal WCKB. The second semiconductor apparatus 120 may be connected to the first semiconductor apparatus 410 through the command address bus 402, and may receive a command address signal CA from the first semiconductor apparatus 410. The command address signal CA may include a plurality of signal sets including a plurality of bits. The second semiconductor apparatus 420 may receive the command address signal CA based on the system clock signal WCK.

The second semiconductor apparatus 420 may be connected to the first semiconductor apparatus 410 through the data bus 403, and may receive data DQ1 to DQn and DQx from the first semiconductor apparatus 410 or transmit the data DQ1 to DQn and DQx to the first semiconductor apparatus 110. The data bus 403 may include a plurality of data transmission lines. For example, the data bus 403 may include first to n+1th data transmission lines 403-1, 403-2, ..., 403-n, 403-n+1. First data DQ1 may be transmitted between the first and second semiconductor apparatuses 410 and 420 through the first data transmission line 403-1, and the second data DQ2 may be transmitted between the first and second semiconductor apparatuses 410 and 420 through the second data transmission line 403-2. $N^{th}$ data DQn may be transmitted between the first and second semiconductor apparatuses 410 and 420 through the $n^{th}$ data transmission line 403-n. Extension data DQx may be transmitted between the first and second semiconductor apparatuses 410 and 420 through the n+1th data transmission line 403-n+1. The second semiconductor apparatus 420 may communicate with the first semiconductor apparatus 410 in a first signaling mode and a second signaling mode. The first signaling mode may be a Non Return to Zero (NRZ) signal transmission mode, and the second signaling mode may be a pulse amplitude modulation (PAM) signal transmission mode. When the semiconductor system 400 uses the first signaling mode, the first to $n^{th}$ data DQ1, DQ2, ..., DQn may be transmitted through the first to $n^{th}$ data transmission lines 403-1, 403-2, ..., 403-n. When the semiconductor system 400 uses the second signaling mode, the extension data DQx may be transmitted through the n+1th data transmission line 403-n+1 together with the first to $n^{th}$ data DQ1, DQ2, ..., DQn. When the semiconductor system 400 uses the first signaling mode, the n+1th data transmission line 403-n+1 may be deactivated, and when the semiconductor system 400 uses the second signaling mode, the n+1th data transmission line 403-n+1 may be activated.

The first semiconductor apparatus 410 may include a system clock generation circuit 411, a command address generation circuit 412, and a data input/output circuit 413. The system clock generation circuit 411 may generate the system clock signal WCK and the system clock bar signal WCKB. The system clock generation circuit 411 may include any clock generator for generating the system clock signal WCK. For example, the system clock generation circuit 411 may include an oscillator, a phase locked loop circuit, a delay locked loop circuit, and the like. The system clock generation circuit 411 may generate the system clock signal WCK having a frequency suitable for communication between the first and second semiconductor apparatuses 410 and 420. The system clock generation circuit 411 may transmit the system clock signal WCK and the system clock bar signal WCKB to the second semiconductor apparatus 420 through the clock bus 401. The system clock generation circuit 411 may provide the system clock signal WCK and the system clock bar signal WCKB to at least one of the command address generation circuit 412 and the data input/output circuit 413.

The command address generation circuit 412 may generate a command address signal CA based on a request REQ of a user. The command address generation circuit 412 may generate the command address signal CA that instructs the second semiconductor apparatus 420 to perform various operations according to the request REQ. The command address generation circuit 412 may transmit the command address signal CA to the second semiconductor apparatus 420 through the command address bus 402. The command address generation circuit 412 may receive the system clock signal WCK, and output the command address signal CA to the command address bus 402 in synchronization with the system clock signal WCK.

The data input/output circuit 413 may be connected to the second semiconductor apparatus 420 through the data bus 403, and may transmit the data DQ1, DQ2, ..., DQn, DQx to the second semiconductor apparatus 420 through the data bus 403 or receive the data DQ1, DQ2, ..., DQn, DQx transmitted from the second semiconductor apparatus 420. The data input/output circuit 413 may receive the system clock signal WCK, and perform data input/output operations in synchronization with the system clock signal WCK. The data input/output circuit 413 may generate the data DQ1, DQ2, ..., DQn, DQx from internal data IND1 of the first semiconductor apparatus 410 in synchronization with the system clock signal WCK, and transmit the data DQ1, DQ2, . . . , DQn, DQx to the second semiconductor apparatus 420 through the data bus 403. The data input/output circuit 413 may receive the data DQ1, DQ2, . . . , DQn, DQx transmitted from the second semiconductor apparatus 420 in synchronization with the system clock signal WCK, and generate the internal data IND1 of the first semiconductor apparatus 410 based on the received data.

The second semiconductor apparatus 420 may include a clock distribution network 421, a command address control circuit 422, and a data input/output circuit 423. The clock distribution network 421 may be connected to the clock bus 401, and may receive the system clock signal WCK transmitted from the first semiconductor apparatus 410 through the clock bus 401. The clock distribution network 421 may receive the system clock signal WCK by differentially amplifying the system clock signal WCK and the system clock bar signal WCKB. The clock distribution network 421 may generate a plurality of internal clock signals based on the system clock signal pair WCK and WCKB. The plurality of internal clock signals may include a command clock signal CCK and a data clock signal DCK. The clock distribution network 421 may distribute the plurality of internal clock signals to internal circuits of the second semiconductor apparatus 420. The clock distribution network 421 may provide the command clock signal CCK to the command address control circuit 422, and provide the data clock signal DCK to the data input/output circuit 423. The data clock signal DCK may have a higher frequency than the command clock signal CCK. The clock distribution network 421 may include a frequency divider such as a clock divider in order to generate a plurality of internal clock signals with different frequencies from the system clock signal pair WCK and WCKB. The clock distribution network 421 may include a plurality of clock trees for distributing the plurality of internal clock signals.

The command address control circuit 422 may be connected to the command address bus 402, and may receive the command address signal CA transmitted from the first semiconductor apparatus 410 through the command address bus 402. The command address control circuit 422 may receive a reference voltage VREF, and receive the command address signal CA by differentially amplifying the command address signal CA and the reference voltage VREF. The command address control circuit 422 may receive the command clock signal CCK from the clock distribution network 421. The command address control circuit 422 may synchronize the received command address signal CA with the command clock signal CCK by latching the received command address signal CA in synchronization with the command clock signal CCK. The command address control circuit 422 may generate a signaling mode signal SM based on the command address signal CA. The signaling mode signal SM may be disabled when the first and second semiconductor apparatuses 410 and 420 perform communication by using the first signaling mode, and may be enabled when the first and second semiconductor apparatuses 410 and 420 perform communication by using the second signaling mode. The command address control circuit 422 may generate a low power mode signal LP, a read signal RD, and a write signal WT based on the command address signal CA. The command address control circuit 422 may provide the signaling mode signal SM, the low power mode signal LP, the read signal RD, and the write signal WT to the clock distribution network 421. The clock distribution network 421 may individually control whether to activate the plurality of clock trees based on the signaling mode signal SM, the low power mode signal LP, the read signal RD, and the write signal WT.

The data input/output circuit 423 may be connected to the first semiconductor apparatus 410 through the first to n+1th data transmission lines 403-1, 403-2, . . . , 403-n, 403-n+1, may transmit the first to $n^{th}$ data DQ1, DQ2, . . . , DQn and the extension data DQx to the first semiconductor apparatus 410 through the first to n+1th data transmission lines 403-1, 403-2, . . . , 403-n, 403-n+1 or receive the first to $n^{th}$ data DQ1, DQ2, . . . , DQn and the extension data DQx transmitted from the first semiconductor apparatus 410. The data input/output circuit 423 may receive the data clock signal DCK from the clock distribution network 422, and perform data input/output operations in synchronization with the data clock signal DCK. The data input/output circuit 423 may generate the first to $n^{th}$ data DQ1, DQ2, . . . , DQn and the extension data DQx based on the internal data IND2 of the second semiconductor apparatus 420 in synchronization with the data clock signal DCK, and transmit the first to $n^{th}$ data DQ1, DQ2, . . . , DQn and the extension data DQx to the first semiconductor apparatus 410. The data input/output circuit 424 may receive the first to $n^{th}$ data DQ1, DQ2, . . . , DQn and the extension data DQx transmitted from the first semiconductor apparatus 410 in synchronization with the data clock signal DCK, and generate the internal data IND2 of the second semiconductor apparatus 420 based on the received data.

Figure 7:
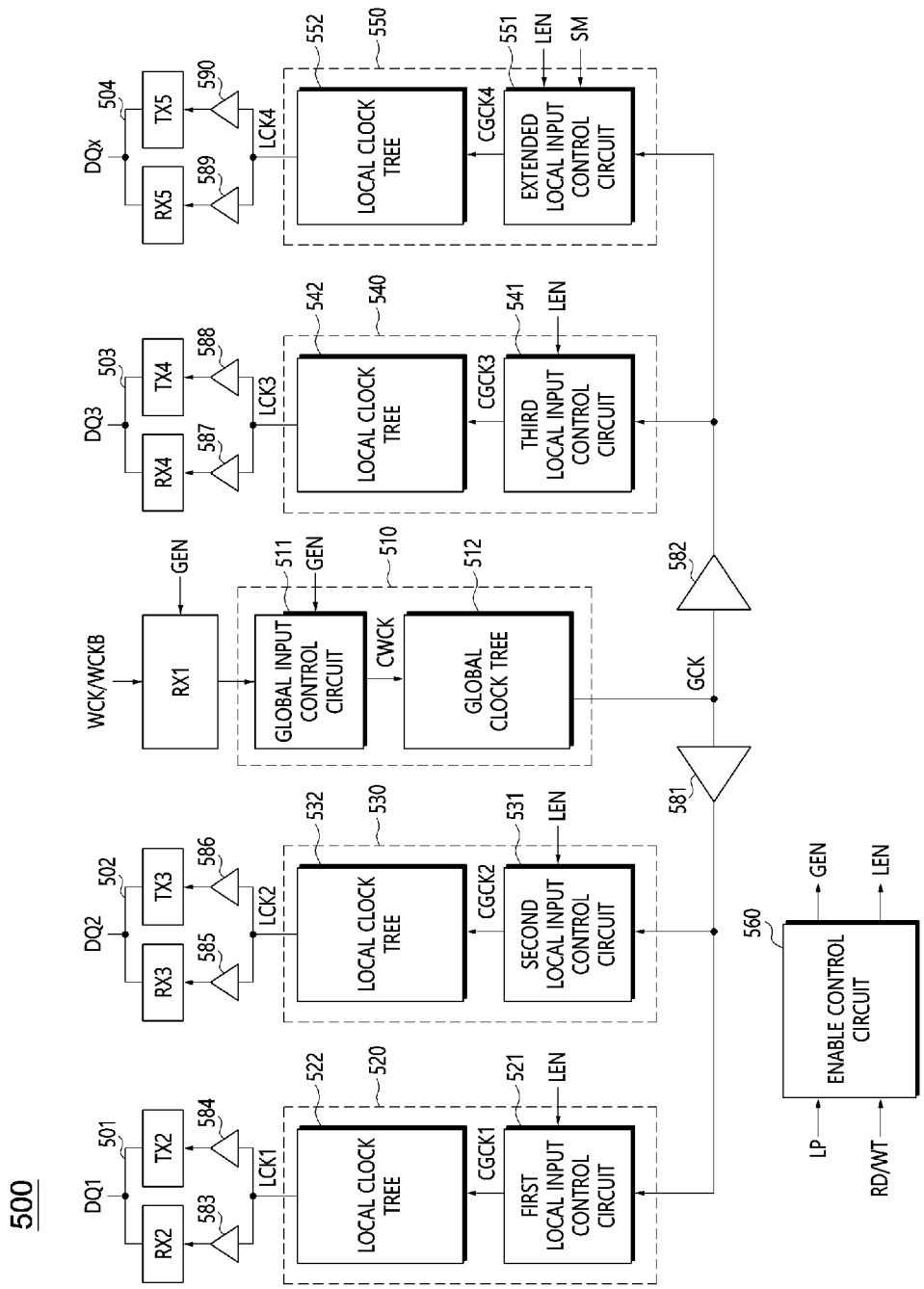
FIG. 7 is a diagram illustrating a configuration of a semiconductor apparatus in accordance with an embodiment.

FIG. 7 is a diagram illustrating the configuration of a semiconductor apparatus 500 in accordance with an embodiment. The semiconductor apparatus 500 may be applied as the second semiconductor apparatus 420 of FIG. 6. Referring to FIG. 7, the semiconductor apparatus 500 may include a clock distribution network. The clock distribution network may receive a system clock signal WCK from an external device (that is, the first semiconductor apparatus 410 of FIG. 6), and buffer the system clock signal WCK. The clock distribution network may distribute the buffered system clock signal WCK to internal circuits of the semiconductor apparatus 500. The clock distribution network may include a global clock generation circuit 510. The global clock generation circuit 510 may receive the system clock signal WCK and a global enable signal GEN, and generate a global clock signal GCK based on the system clock signal WCK and the global enable signal GEN. The semiconductor apparatus 500 may further include a clock reception circuit RX1 that receives the system clock signal WCK. The semiconductor apparatus 500 may receive the system clock signal WCK and a system clock bar signal WCKB as differential signals. The clock reception circuit RX1 may further receive the global enable signal GEN. When the global enable signal GEN is enabled, the clock reception circuit RX1 may be activated to receive the system clock signal WCK. When the global enable signal GEN is disabled, the clock receiving circuit RX1 may be deactivated to output an output signal fixed to a specific logic level. The clock reception circuit RX1 may be integrated as a component of the clock distribution network.

The global clock generation circuit 510 may include a global input control circuit 511 and a global clock tree 512. The global input control circuit 511 may receive the system clock signal WCK and the global enable signal GEN and generate a control system clock signal CWCK. When the global enable signal GEN is enabled, the global input control circuit 511 may output the system clock signal WCK as the control system clock signal CWCK. When the global enable signal GEN is disabled, the global input control circuit 511 may fix a logic level of the control system clock signal CWCK. Whenever the global enable signal GEN is disabled, the global input control circuit 511 may alternately change a DC level of the control system clock signal CWCK. The global input control circuit 511 may generate a level signal by dividing the global enable signal GEN, and output the level signal as the control system clock signal CWCK in a period in which the global enable signal GEN is disabled. The input control circuit 200 illustrated in FIG. 2 may be applied as the global input control circuit 511. When the input control circuit 200 is applied as the global input control circuit 511, the input clock signal CKI, the low power mode signal LP, and the control input clock signal CCKI may be replaced with the system clock signal WCK, the global enable signal GEN, and the control system clock signal CWCK, respectively.

The global clock tree 512 may be connected to the global input control circuit 511, and receive the control system clock signal CWCK from the global input control circuit 511. The global clock tree 512 may generate a global clock signal GCK by buffering the control system clock signal CWCK. The global clock tree 512 may include at least one buffer for buffering the control system clock signal CWCK.

The clock distribution network may further include a first local clock generation circuit 520. The global clock generation circuit 510 may provide the global clock signal GCK to the first local clock generation circuit 520. The clock distribution network may further include a first buffer 581 and a second buffer 582 that buffer the global clock signal GCK. The first local clock generation circuit 520 may receive the global clock signal GCK and generate a first local clock signal LCK1. The first local clock generation circuit 520 may include a first local input control circuit 521 and a local clock tree 522. The first local input control circuit 521 may receive the global clock signal GCK and the local enable signal LEN and generate a first control global clock signal CGCK1. When the local enable signal LEN is enabled, the first local input control circuit 521 may output the global clock signal GCK as the first control global clock signal CGCK1. When the local enable signal LEN is disabled, the first local input control circuit 521 may fix a logic level of the first control global clock signal CGCK1. Whenever the local enable signal LEN is disabled, the first local input control circuit 421 may change the logic level of the first control global clock signal CGCK1. The first local input control circuit 521 may generate a level signal by dividing the local enable signal LEN, and output the level signal as the first control global clock signal CGCK1 in a period in which the local enable signal LEN is disabled. The input control circuit 200 illustrated in FIG. 2 may be applied as the first local input control circuit 521. When the input control circuit 200 is applied as the first local input control circuit 521, the input clock signal CKI, the low power mode signal LP, and the control input clock signal CCKI may be replaced with the global clock signal GCK, the local enable signal LEN, and the first control global clock signal CGCK1, respectively.

The local clock tree 522 may be connected to the first local input control circuit 521, and receive the first control global clock signal CGCK1 from the first local input control circuit 521. The local clock tree 522 may generate a first local clock signal LCK1 by buffering the first control global clock signal CGCK1. The local clock tree 522 may include at least one buffer for buffering the first control global clock signal CGCK1. The semiconductor apparatus 500 may further include a third buffer 583, a fourth buffer 584, a first data receiver RX2, and a first data transmitter TX2. The third buffer 583 may receive the first local clock signal LCK1 from the local clock tree 522 and buffer the first local clock signal LCK1. The third buffer 583 may provide the first local clock signal LCK1 to the first data receiver RX2. The fourth buffer 584 may receive the first local clock signal LCK1 from the local clock tree 522, and buffer the first local clock signal LCK1. The fourth buffer 584 may provide the first local clock signal LCK1 to the first data transmitter TX2. The first data receiver RX2 and the first data transmitter TX2 may be components connected to the first data transmission line 403-1 among the components of the data input/output circuit 423 in FIG. 6. The first data receiver RX2 may be connected to a first data transmission line 501, and receive first data DQ1 transmitted from the external device. The first data receiver RX2 may receive the first local clock signal LCK1, and receive the first data DQ1 based on the first local clock signal LCK1. The first data receiver RX2 may receive the first data DQ1 in synchronization with the first local clock signal LCK1, or align the first data DQ1 and generate internal data of the semiconductor apparatus 500. The first data transmitter TX2 may be connected to the first data transmission line 501, and transmit the first data DQ1 generated based on the internal data of the semiconductor apparatus 500 to the external device. The first data transmitter TX2 may receive the first local clock signal LCK1, and transmit the first data DQ1 based on the first local clock signal LCK1. The first data transmitter TX2 may output the first data DQ1 to the first data transmission line 501 in synchronization with the first local clock signal LCK1.

The clock distribution network may further include a second local clock generation circuit 530. The second local clock generation circuit 530 may receive the global clock signal GCK and generate a second local clock signal LCK2. The second local clock generation circuit 530 may include a second local input control circuit 531 and a local clock tree 532. The second local input control circuit 531 may receive the global clock signal GCK and the local enable signal LEN and generate a second control global clock signal CGCK2. When the local enable signal LEN is enabled, the second local input control circuit 531 may output the global clock signal GCK as the second control global clock signal CGCK2. When the local enable signal LEN is disabled, the second local input control circuit 531 may fix a logic level of the second control global clock signal CGCK2. Whenever the local enable signal LEN is disabled, the second local input control circuit 531 may alternately change a DC level of the second control global clock signal CGCK2. The second local input control circuit 531 may generate a level signal by dividing the local enable signal LEN, and output the level signal as the second control global clock signal CGCK2 in a period in which the local enable signal LEN is disabled. The input control circuit 200 illustrated in FIG. 2 may be applied as the second local input control circuit 531. When the input control circuit 200 is applied as the second local input control circuit 531, the input clock signal CKI, the low power mode signal LP, and the control input clock signal CCKI may be replaced with the global clock signal GCK, the local enable signal LEN, and the second control global clock signal CGCK2, respectively.

The local clock tree 532 may be connected to the second local input control circuit 531, and receive the second control global clock signal CGCK2 from the second local input control circuit 531. The local clock tree 532 may generate a second local clock signal LCK2 by buffering the second control global clock signal CGCK2. The local clock tree 532 may include at least one buffer for buffering the second control global clock signal CGCK2. The semiconductor apparatus 500 may further include a fifth buffer 585, a sixth buffer 586, a second data receiver RX3, and a second data transmitter TX3. The fifth buffer 585 may receive the second local clock signal LCK2 from the local clock tree 532, and buffer the second local clock signal LCK2. The fifth buffer 585 may provide the second local clock signal LCK2 to the second data receiver RX3. The sixth buffer 586 may receive the second local clock signal LCK2 from the local clock tree 532, and buffer the second local clock signal LCK2. The sixth buffer 586 may provide the second local clock signal LCK2 to the second data transmitter TX3. The second data receiver RX3 and the second data transmitter TX3 may be components connected to the second data transmission line 403-2 among the components of the data input/output circuit 523 in FIG. 6. The second data receiver RX3 may be connected to the second data transmission line 502, and receive second data DQ2 transmitted from the external device. The second data receiver RX3 may receive the second local clock signal LCK2, and receive the second data DQ2 based on the second local clock signal LCK2. The second data receiver RX3 may receive the second data DQ2 in synchronization with the second local clock signal LCK2, or align the second data DQ2 and generate internal data of the semiconductor apparatus 500. The second data transmitter TX3 may be connected to the second data transmission line 502, and transmit the second data DQ2 generated based on the internal data of the semiconductor apparatus 500 to the external device. The second data transmitter TX3 may receive the second local clock signal LCK2, and transmit the second data DQ2 based on the second local clock signal LCK2. The second data transmitter TX3 may output the second data DQ2 to the second data transmission line 502 in synchronization with the second local clock signal LCK2.

The clock distribution network may further include a third local clock generation circuit 540. The third local clock generation circuit 540 may receive the global clock signal GCK and generate a third local clock signal LCK3. The third local clock generation circuit 540 may include a third local input control circuit 541 and a local clock tree 542. The third local input control circuit 541 may receive the global clock signal GCK and the local enable signal LEN, and generate a third control global clock signal CGCK3. When the local enable signal LEN is enabled, the third local input control circuit 541 may output the global clock signal GCK as the third control global clock signal CGCK3. When the local enable signal LEN is disabled, the third local input control circuit 541 may fix a logic level of the third control global clock signal CGCK3. Whenever the local enable signal LEN is disabled, the third local input control circuit 541 may alternately change a DC level of the third control global clock signal CGCK3. The third local input control circuit 541 may generate a level signal by dividing the local enable signal LEN, and output the level signal as the third control global clock signal CGCK3 in a period in which the local enable signal LEN is disabled. The input control circuit 200 illustrated in FIG. 2 may be applied as the third local input control circuit 541. When the input control circuit 200 is applied as the third local input control circuit 541, the input clock signal CKI, the low power mode signal LP, and the control input clock signal CCKI may be replaced with the global clock signal GCK, the local enable signal LEN, and the third control global clock signal CGCK3, respectively.

The local clock tree 542 may be connected to the third local input control circuit 541, and receive the third control global clock signal CGCK3 from the third local input control circuit 541. The local clock tree 542 may generate a third local clock signal LCK3 by buffering the third control global clock signal CGCK3. The local clock tree 542 may include at least one buffer for buffering the third control global clock signal CGCK3. The semiconductor apparatus 500 may further include a seventh buffer 587, an eighth buffer 588, a third data receiver RX4, and a third data transmitter TX4. The seventh buffer 587 may receive the third local clock signal LCK3 from the local clock tree 542, and buffer the third local clock signal LCK3. The seventh buffer 587 may provide the third local clock signal LCK3 to the third data receiver RX4. The eighth buffer 588 may receive the third local clock signal LCK3 from the local clock tree 542, and buffer the third local clock signal LCK3. The eighth buffer 588 may provide the third local clock signal LCK3 to the third data transmitter TX4. The third data receiver RX4 and the third data transmitter TX4 may be components connected to the third data transmission line among the components of the data input/output circuit 423 in FIG. 6. The third data receiver TX4 may be connected to the third data transmission line 503, and receive third data DQ3 transmitted from the external device. The third data receiver RX4 may receive the third local clock signal LCK3, and receive the third data DQ3 based on the third local clock signal LCK3. The third data receiver RX4 may receive the third data DQ3 in synchronization with the third local clock signal LCK3, or align the third data DQ3 and generate internal data of the semiconductor apparatus 500. The third data transmitter TX4 may be connected to the third data transmission line 503, and transmit the third data DQ3 generated based on the internal data of the semiconductor apparatus 500 to the external device. The third data transmitter TX4 may receive the third local clock signal LCK3, and transmit the third data DQ3 based on the third local clock signal LCK3. The third data transmitter TX4 may output the third data DQ3 to the third data transmission line 503 in synchronization with the third local clock signal LCK3.

The clock distribution network may further include a fourth local clock generation circuit 550. The fourth local clock generation circuit 550 may receive the global clock signal GCK and generate a fourth local clock signal LCK4. The fourth local clock generation circuit LCK4 may include an extended local input control circuit 551 and a local clock tree 552. The extended local input control circuit 551 may receive the global clock signal GCK, the local enable signal LEN, and the signaling mode signal SM, and generate a fourth control global clock signal CGCK4. When the local enable signal LEN and the signaling mode signal SM are enabled, the extended local input control circuit 551 may output the global clock signal GCK as the fourth control global clock signal CGCK4. When at least one of the local enable signal LEN and the signaling mode signal SM is disabled, the extended local input control circuit 551 may fix a logic level of the fourth control global clock signal CGCK4. Whenever at least one of the local enable signal LEN and the signaling mode signal SM is disabled, the extended local input control circuit 551 may change a DC level of the fourth control global clock signal CGCK4. The extended local input control circuit 551 may generate an extended level signal by dividing the local enable signal LEN and the signaling mode signal SM, and output the extended level signal as the fourth control global clock signal CGCK4 in a period in which the local enable signal LEN is disabled.

The local clock tree 552 may be connected to the fourth local input control circuit 551, and receive the fourth control global clock signal CGCK4 from the fourth local input control circuit 551. The local clock tree 552 may generate a fourth local clock signal LCK4 by buffering the fourth control global clock signal CGCK4. The local clock tree 552 may include at least one buffer for buffering the fourth control global clock signal CGCK4. The semiconductor apparatus 500 may further include a ninth buffer 589, a tenth buffer 590, a fourth data receiver RX5, and a fourth data transmitter TX5. The ninth buffer 589 may receive the fourth local clock signal LCK4 from the local clock tree 552, and buffer the fourth local clock signal LCK4. The ninth buffer 589 may provide the fourth local clock signal CLK4 to the fourth data receiver RX5. The tenth buffer 590 may receive the fourth local clock signal LCK4 from the local clock tree 552, and buffer the fourth local clock signal LCK4. The tenth buffer 590 may provide the fourth local clock signal LCK4 to the fourth data transmitter TX5. The fourth data receiver RX5 and the fourth data transmitter TX5 may be components connected to the n+1th data transmission line 403-$n$+1 among the components of the data input/output circuit 423 in FIG. 6. The fourth data receiver RX5 may be connected to the fourth data transmission line 504, and receive the extended data DQx transmitted from the external device. The fourth data receiver RX5 may receive the fourth local clock signal LCK4, and receive the extension data DQx based on the fourth local clock signal LCK4. The fourth data receiver RX5 may receive the extension data DQx in synchronization with the fourth local clock signal LCK4, or align the extension data DQx and generate internal data of the semiconductor apparatus 500. The fourth data transmitter TX5 may be connected to the fourth data transmission line 504, and transmit the extended data DQx generated based on the internal data of the semiconductor apparatus 500 to the external device. The fourth data transmitter TX5 may receive the fourth local clock signal LCK5, and transmit the extended data DQx based on the fourth local clock signal LCK5. The fourth data transmitter TX5 may output the extended data DQx to the fourth data transmission line 504 in synchronization with the fourth local clock signal LCK5.

The clock distribution network and/or the semiconductor apparatus 500 may further include an enable control circuit 560. The enable control circuit 560 may receive the low power mode signal LP and generate the global enable signal GEN. When the low power mode signal LP is disabled, the enable control circuit 560 may enable the global enable signal GEN. When the low power mode signal LP is enabled, the enable control circuit 560 may disable the global enable signal GEN. The enable control circuit 560 may further receive a read signal RD and a write signal WT, and may generate the local enable signal LEN based on at least a part of the low power mode signal LP, the read signal RD, and the write signal WT. When at least one of the read signal RD and the write signal WT is enabled, the enable control circuit 560 may enable the local enable signal LEN. When the low power mode signal LP is enabled, the enable control circuit 560 may disable the local enable signal LEN. Even though the low power mode signal LP is in a disabled state, when both the read signal RD and the write signal WT are disabled, the enable control circuit 560 may disable the local enable signal LEN.

Figure 8:
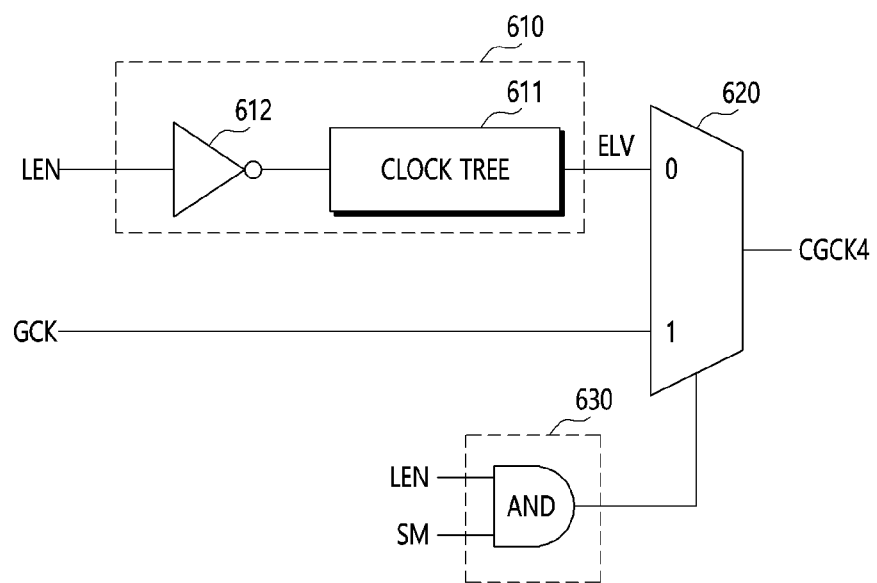
FIG. 8 is a diagram illustrating a configuration of an expanded local input control circuit illustrated in FIG. 7.

FIG. 8 is a diagram illustrating the configuration of the extended local input control circuit 551 illustrated in FIG. 7. Referring to FIG. 8, the extended local input control circuit 551 may receive the global clock signal GCK, the local enable signal LEN, and the signaling mode signal SM, and generate the fourth control global clock signal CGCK4. When the local enable signal LEN and the signaling mode signal SM are enabled, the extended local input control circuit 551 may output the global clock signal GCK as the fourth control global clock signal CGCK4. When at least one of the local enable signal LEN and the signaling mode signal SM is disabled, the extended local input control circuit 551 may output an extended level signal ELV as the fourth control global clock signal CGCK4. Whenever the local enable signal LEN is disabled, the extended local input control circuit 551 may change a logic level of the extended level signal ELV. The extended local input control circuit 551 may generate the extended level signal ELV by dividing the local enable signal LEN.

The extended local input control circuit 551 may include a polarity conversion circuit 610 and a selection circuit 620. The polarity conversion circuit 610 may receive the local enable signal LEN and generate the extended level signal ELV. Whenever the local enable signal LEN is disabled, the polarity conversion circuit 610 may change a DC level of the extended level signal ELV. The polarity conversion circuit 610 may include a division circuit 611. The division circuit 611 may generate the extended level signal ELV by dividing the local enable signal LEN. In an embodiment, the polarity conversion circuit 610 may further include an inverter 612. The local enable signal LEN may be disabled to a low logic level, and the divider circuit 611 may operate in synchronization with a rising edge. The polarity conversion circuit 610 may further include the inverter 612 in order to invert the local enable signal LEN that is disabled to a low logic level. However, the inverter 612 is not an essential component of the polarity conversion circuit 610 and may be optionally provided. In an embodiment, the inverter 612 may be integrated into the division circuit 611.

The selection circuit 620 may receive the extended level signal ELV, the global clock signal GCK, the local enable signal LEN, and the signaling mode signal SM. The selection circuit 620 may output one of the extension level signal ELV and the global clock signal GCK as the fourth control global clock signal CGCK4 based on the local enable signal LEN and the signaling mode signal SM. When both the local enable signal LEN and the signaling mode signal SM are enabled, the selection circuit 620 may output the global clock signal GCK as the fourth control global clock signal CGCK4. When at least one of the local enable signal LEN and the signaling mode signal SM is disabled, the selection circuit 620 may output the extended level signal ELV as the fourth control global clock signal CGCK4. In an embodiment, the selection circuit 620 may include, for example but not limited to, a 2 to 1 multiplexer that receives a combination of the local enable signal LEN and the signaling mode signal SM as a control signal, receives the extended level signal ELV and the global clock signal GCK, and outputs the fourth control global clock signal CGCK4.

The extended local input control circuit 551 may further include a gating circuit 630. The gating circuit 630 may receive the local enable signal LEN and the signaling mode signal SM, and logically combine the local enable signal LEN and the signaling mode signal SM. The selection circuit 620 may receive an output signal of the gating circuit 630. When both the local enable signal LEN and the signaling mode signal SM are enabled, the gating circuit 630 may generate the output signal that is enabled to a high logic level. When at least one of the local enable signal LEN and the signaling mode signal SM is disabled, the gating circuit 630 may generate the output signal that is enabled to a low logic level. The gating circuit 630 may include an AND gate AND. A first input terminal of the AND gate AND may receive the local enable signal LEN, a second input terminal of the AND gate AND may receive the signaling mode signal SM, and the output signal may be output from an output terminal of the AND gate AND.

Referring to FIGS. 6 to 8, in an embodiment, the fourth local clock generation circuit 550 may be activated only when the second signaling mode is used even though the data input/output circuit 423 performs the data input/output operations. Accordingly, in an embodiment, when the semiconductor system 400 of FIG. 6 performs communication by using the first signaling mode, the fourth local clock generation circuit 550 may continuously cause uneven deterioration regardless of whether the low power mode signal LP is enabled. In an embodiment, the extended local input control circuit 551 may alternately change the DC level of the fourth control global clock signal CGCK4 based on the local enable signal LEN, thereby mitigating uneven deterioration from occurring in the local clock tree 552.

A person skilled in the art to which the present disclosure pertains can understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that all changes or modified forms derived from the meaning and scope of the claims and the equivalent concept thereof are included in the scope of the present disclosure.

What is claimed is:

1. A clock distribution network comprising:
    an input control circuit configured to receive an input clock signal and a low power mode signal to generate a control input clock signal and a level signal, to output the input clock signal as a control input clock signal when the low power mode signal is disabled, to output the level signal as the control input clock signal when the low power mode signal is enabled, and to alternately change a direct current (DC) level of the level signal to a first level and a second level each time the low power mode signal is enabled; and
    a clock tree configured to receive the control input clock signal to generate an output clock signal by buffering the control input clock signal.

2. The clock distribution network according to claim 1, wherein the input control circuit comprises:
    a polarity conversion circuit configured to change a logic level of the level signal whenever the low power mode signal is enabled; and
    a selection circuit configured to output one of the input clock signal and the level signal as the control input clock signal based on the low power mode signal.

3. A semiconductor apparatus comprising:
    a global input control circuit configured to receive a system clock signal and a global enable signal to output the system clock signal as a control system clock signal when the global enable signal is enabled, to fix a logic level of the control system clock signal when the global enable signal is disabled, and to change a direct current (DC) level of the control system clock signal whenever the global enable signal is disabled; and
    a global clock tree configured to receive the control system clock signal to generate a first global clock signal by buffering the control system clock signal.

4. The semiconductor apparatus according to claim 3, wherein the global input control circuit comprises:
    a polarity conversion circuit configured to receive the global enable signal to generate a level signal and to change a logic level of the level signal whenever the global enable signal is disabled; and
    a selection circuit configured to receive the level signal, the global enable signal, and the system clock signal to output one of the level signal and the system clock signal based on the global enable signal.

5. The semiconductor apparatus according to claim 3, further comprising:
    an enable control circuit configured to receive a low power mode signal to generate the global enable signal based on the low power mode signal.

6. The semiconductor apparatus according to claim 3, further comprising:
    a local input control circuit configured to receive a local enable signal and the first global clock signal to output the first global clock signal as a control global clock signal when the local enable signal is enabled, to fix a logic level of the control global clock signal when the local enable signal is disabled, and to change a DC level of the control global clock signal whenever the local enable signal is disabled; and
    a local clock tree configured to receive the control global clock signal to generate a local clock signal by buffering the control global clock signal.

7. The semiconductor apparatus according to claim 6, wherein the local input control circuit comprises:
    a polarity conversion circuit configured to receive the local enable signal to generate a level signal and to change a logic level of the level signal whenever the local enable signal is disabled; and
    a selection circuit configured to receive the level signal, the local enable signal, and the first global clock signal to output one of the level signal and the first global clock signal as the control global clock signal based on the local enable signal.

8. The semiconductor apparatus according to claim 6, further comprising:
    an enable control circuit configured to receive a low power mode signal, read signal, and write signal to generate the global enable signal and the local enable signal based on at least a part of the low power mode signal, the read signal, and the write signal.

9. The semiconductor apparatus according to claim 8, wherein the enable control circuit disables the global enable signal and the local enable signal when the low power mode signal is enabled, and the enable control circuit enables the global enable signal when the low power mode signal is disabled.

10. The semiconductor apparatus according to claim 9, wherein the enable control circuit enables the local enable signal when at least one of the read signal and the write signal is enabled, and the enable control circuit disables the local enable signal when both the read signal and the write signal are disabled.

11. The semiconductor apparatus according to claim 3, further comprising:
    an extended local input control circuit configured to receive the local enable signal, a signaling mode signal, and the first global clock signal to output the first global clock signal as a control global clock signal when the local enable signal and the signaling mode signal are enabled, to fix a logic level of the control global clock signal when at least one of the local enable signal and the signaling mode signal is disabled, and to change a DC level of the control global clock signal whenever the local enable signal is disabled; and a local clock tree configured to receive the control global clock signal to generate a local clock signal by buffering the control global clock signal.

12. The semiconductor apparatus according to claim 11, wherein the extended local input control circuit comprises:
a polarity conversion circuit configured to receive the local enable signal to generate a level signal to change a logic level of the level signal whenever the local enable signal is disabled; and
a selection circuit configured to receive the level signal, the local enable signal, the signaling mode signal, and the first global clock signal to output one of the level signal and the first global clock signal as the control global clock signal based on the local enable signal and the signaling mode signal.

13. The semiconductor apparatus according to claim 3, wherein the global clock tree receives the control system clock signal to further generate a second global clock signal by dividing the control system clock signal.

14. The semiconductor apparatus according to claim 13, further comprising:
a local input control circuit configured to receive the global enable signal and the second global clock signal to output the second global clock signal as a control global clock signal when the global enable signal is enabled, to fix a logic level of the control global clock signal when the global enable signal is disabled, and to change a DC level of the control global clock signal whenever the global enable signal is disabled; and
a local clock tree configured to receive the control global clock signal to generate a local clock signal by buffering the control global clock signal.

15. The semiconductor apparatus according to claim 14, wherein the local input control circuit comprises:
a polarity conversion circuit configured to receive the global enable signal to generate a level signal and to change a logic level of the level signal whenever the global enable signal is disabled; and
a selection circuit configured to receive the level signal, the global enable signal, and the second global clock signal to output one of the level signal and the second global clock signal as the control global clock signal based on the global enable signal.

16. A clock distribution network comprising:
an input control circuit configured to receive an enable signal and an input clock signal to generate a level signal by dividing the enable signal, and to output one of the level signal and an input clock signal as a control input clock signal based on the enable signal; and
a clock tree configured to receive the control input clock signal to generate an output clock signal by buffering the control input clock signal.

17. The clock distribution network according to claim 16, wherein the input control circuit comprises:
a division circuit configured to receive the enable signal to generate the level signal by dividing the enable signal; and
a selection circuit configured to receive the level signal, the enable signal and the input clock signal to output the input clock signal as the control input clock signal when the enable signal is enabled, and to output the level signal as the control input clock signal when the enable signal is disabled.

18. A semiconductor apparatus comprising:
a global input control circuit configured to receive a system clock signal and a global enable signal to generate a first level signal by dividing the global enable signal, and to output one of the first level signal and the system clock signal as a control system clock signal based on the global enable signal; and
a global clock tree configured to receive the control system clock signal to generate a first global clock signal by buffering the control system clock signal.

19. The semiconductor apparatus according to claim 18, wherein the global input control circuit changes a logic level of the first level signal whenever the global enable signal is disabled.

20. The semiconductor apparatus according to claim 18, further comprising:
a local input control circuit configured to receive a local enable signal and the first global clock signal to generate a second level signal by dividing the local enable signal, and to output one of the second level signal and the first global clock signal as a control global clock signal based on the local enable signal; and
a local clock tree configured to receive the control global clock signal to generate a local clock signal by buffering the control global clock signal.

21. The semiconductor apparatus according to claim 20, wherein the local input control circuit changes a logic level of the second level signal whenever the local enable signal is disabled.

22. The semiconductor apparatus according to claim 18, further comprising:
a local input control circuit configured to receive a local enable signal, signaling mode signal, and the first global clock signal to generate a second level signal by dividing the local enable signal, and to output one of the second level signal and the first global clock signal as a control global clock signal based on the local enable signal and the signaling mode signal; and
a local clock tree configured to receive the control global clock signal to generate a local clock signal by buffering the control global clock signal.

23. The semiconductor apparatus according to claim 22, wherein the local input control circuit changes a logic level of the second level signal whenever the local enable signal is disabled.

24. The semiconductor apparatus according to claim 18, wherein the global clock tree receives the control system clock signal to further generate a second global clock signal by dividing the control system clock signal.

25. The semiconductor apparatus according to claim 24, further comprising:
a local input control circuit configured to receive a global enable signal to generate a second level signal by dividing the global enable signal, and to receive second global clock signal to output one of the second level signal and the second global clock signal as a control global clock signal based on the global enable signal; and
a local clock tree configured to receive the control global clock signal to generate a local clock signal by buffering the control global clock signal.

26. The semiconductor apparatus according to claim 25, wherein the local input control circuit changes a logic level of the second level signal whenever the global enable signal is disabled.

* * * * *